United States Patent
Burnside

(10) Patent No.: US 9,213,874 B2
(45) Date of Patent: Dec. 15, 2015

(54) RFID SMART GARMENT

(75) Inventor: Walter D. Burnside, Dublin, OH (US)

(73) Assignees: DJB GROUP LLC, Dublin, OH (US); WISTRON NEWEB CORPORATION, Hsinchu (TW)

(*) Notice: Subject to any disclaimer, the term of this patent is extended or adjusted under 35 U.S.C. 154(b) by 214 days.

(21) Appl. No.: 13/542,684

(22) Filed: Jul. 6, 2012

(65) Prior Publication Data

US 2014/0009266 A1    Jan. 9, 2014

(51) Int. Cl.
| | |
|---|---|
| H04Q 5/22 | (2006.01) |
| G08B 13/14 | (2006.01) |
| G06K 7/00 | (2006.01) |
| H01Q 1/00 | (2006.01) |
| G06K 7/10 | (2006.01) |
| H01Q 9/16 | (2006.01) |
| H01Q 9/28 | (2006.01) |

(52) U.S. Cl.
CPC ........ *G06K 7/10396* (2013.01); *G06K 7/10128* (2013.01); *H01Q 9/16* (2013.01); *H01Q 9/28* (2013.01); *G06K 7/0008* (2013.01)

(58) Field of Classification Search
CPC . G06K 7/00; G06K 7/10009; G06K 7/10396; H03D 7/00; H01Q 1/2216; H01Q 21/005; H01Q 13/206; H01Q 21/20; H01Q 1/36; H01Q 9/28; H01Q 9/16; H01Q 21/29; H01Q 7/00; H01Q 9/285; H01Q 1/273
USPC ................. 340/10.1, 10.4, 572.8, 572, 686.6, 340/686.8, 572.4, 568.1, 572.1; 235/439, 235/375, 385, 382; 343/718, 729, 725, 897, 343/893, 742, 730, 225; 455/559, 575.7
See application file for complete search history.

(56) References Cited

U.S. PATENT DOCUMENTS

| | | |
|---|---|---|
| 5,825,327 A | 10/1998 | Krasner |
| 6,356,238 B1 | 3/2002 | Gainor et al. |
| 6,523,752 B2 | 2/2003 | Nishitani et al. |
| 6,680,710 B1 | 1/2004 | Merenda |
| 6,727,197 B1 | 4/2004 | Wilson et al. |
| 6,853,293 B2 | 2/2005 | Swartz et al. |
| 7,002,526 B1 * | 2/2006 | Adams et al. ................. 343/718 |
| 7,123,151 B2 | 10/2006 | Garber et al. |
| 7,242,293 B2 | 7/2007 | Rea et al. |
| 7,450,077 B2 | 11/2008 | Waterhouse et al. |
| 7,576,657 B2 | 8/2009 | Duron et al. |

(Continued)

FOREIGN PATENT DOCUMENTS

KR    10-1082503 B1    11/2011

OTHER PUBLICATIONS

Notification of Transmittal of the International Search Report and the Written Opinion of the International Searching Authority, or the Declaration, International Search Report dated Jun. 28, 2013, Written Opinion of the International Searching Authority for PCT/US2013/033488, filed Mar. 22, 2013.

*Primary Examiner* — Mirza Alam
(74) *Attorney, Agent, or Firm* — Pearne & Gordon LLP

(57) ABSTRACT

In combination, an RFID antenna array, an RFID tag reader, and a power supply, the foregoing components being adapted to be worn or otherwise borne by a person and be operatively connected so that the power supply powers the reader and the reader energizes the antenna array and receives RFID tag signals through the antenna array while the person passes through an area as the person's hands and arms are unencumbered by said components.

12 Claims, 3 Drawing Sheets

(56) References Cited

U.S. PATENT DOCUMENTS

| | | |
|---|---|---|
| 7,760,150 B2 | 7/2010 | Sato |
| 7,830,319 B2 | 11/2010 | Cohen et al. |
| 7,864,045 B2 | 1/2011 | Karr |
| 7,876,274 B2 | 1/2011 | Hobson et al. |
| 7,898,485 B2 | 3/2011 | Schlub et al. |
| 7,902,984 B2 | 3/2011 | Duron et al. |
| 7,916,089 B2 | 3/2011 | Schlub et al. |
| 7,924,231 B2 | 4/2011 | Hill et al. |
| 7,948,448 B2 | 5/2011 | Hutchinson et al. |
| 8,058,998 B2 | 11/2011 | Burnside et al. |
| 8,093,996 B2 | 1/2012 | Heurtier |
| 2002/0038267 A1 | 3/2002 | Can et al. |
| 2003/0020629 A1 | 1/2003 | Swartz et al. |
| 2006/0044112 A1* | 3/2006 | Bridgelall .................... 340/10.1 |
| 2008/0143954 A1 | 6/2008 | Abreu |
| 2009/0117753 A1 | 5/2009 | Lee et al. |
| 2009/0295657 A1 | 12/2009 | Gakhar et al. |
| 2010/0100997 A1 | 4/2010 | Lee et al. |
| 2010/0241467 A1 | 9/2010 | Saw et al. |
| 2010/0271187 A1* | 10/2010 | Uysal et al. .................. 340/10.4 |
| 2010/0309068 A1* | 12/2010 | Duron et al. .................. 343/730 |
| 2011/0051982 A1 | 3/2011 | Abreu |
| 2011/0148581 A1* | 6/2011 | Chamseddine et al. ..... 340/10.1 |
| 2011/0181238 A1 | 7/2011 | Soar |

* cited by examiner

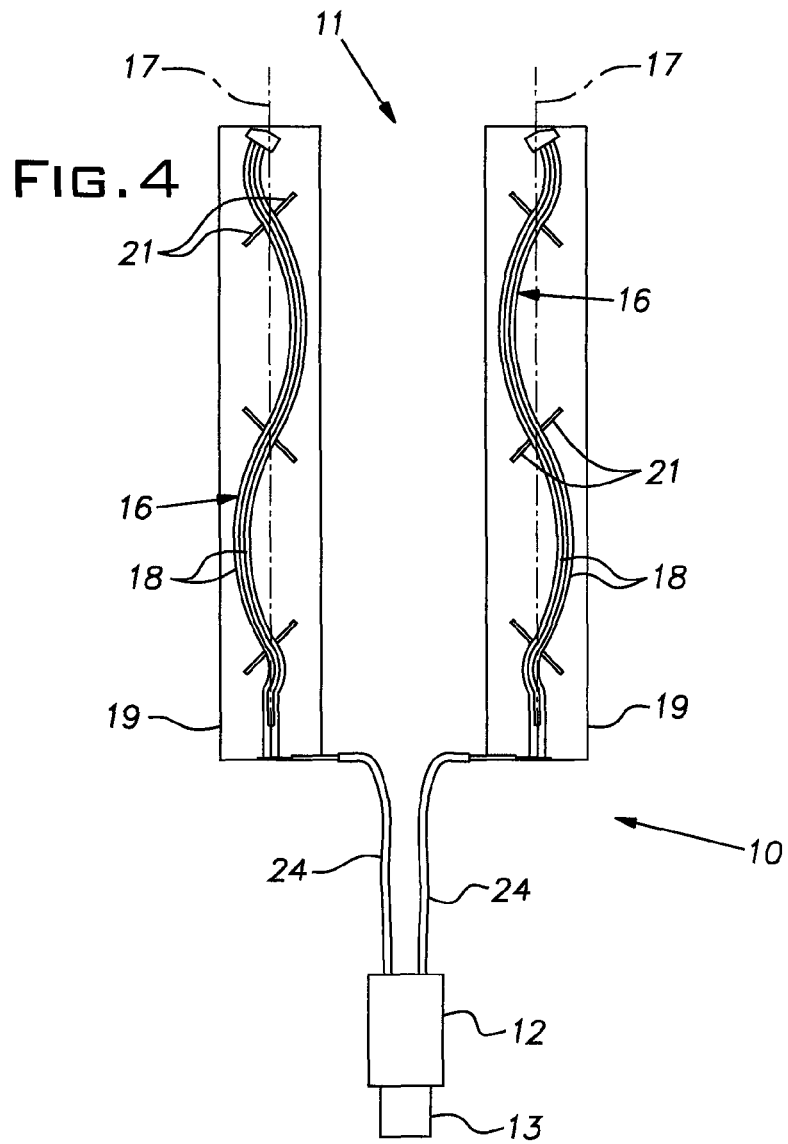
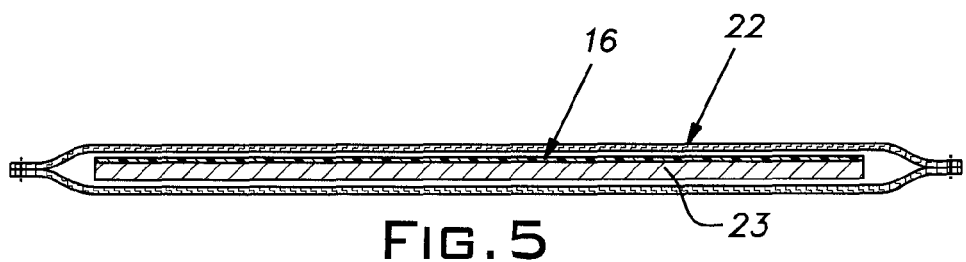

RFID SMART GARMENT

BACKGROUND OF THE INVENTION

The invention relates to RFID implementation and, in particular, to portable RFID reader technology.

PRIOR ART

RFID tags and readers are in use in various inventory control applications as well as in manufacturing, shipping, and other commercial activities. As the cost of RFID systems and RFID tags has reduced, this technology has become more commonplace. In retail stores, warehouses, and in the shipping industry, for example, hand-held readers are carried by employees to scan components, products, packages and other objects. Scanning can be done, as examples, to confirm inventory status or the accuracy of fulfilling a shipping order. Numerous other applications exist and will develop where portable scanners serve important functions. For the most part, present day portable RFID scanners are somewhat unidirectional and are intended to be manually pointed at the object to be identified.

SUMMARY OF THE INVENTION

The invention provides a portable RFID scanning system that can be comfortably worn, if not unconsciously, by an individual. The disclosed scanning system allows an employee to work hands free and perform various traditional tasks while the scanning operation is conducted automatically without specific attention by the employee. The scanning system, according to the invention, can be embodied in a vest-like garment fitted with an antenna array preferably in the form of elongated, flexible, multi-directional RFID antennas. The antennas, ideally, are of a type that exhibit diversity of beam direction and polarity. The antenna array is able to detect RFID tags throughout a near zone proximate to the location of the vest garment wearer. The antenna array is cabled to a portable reader and power supply carried on the vest or otherwise borne by the vest wearer. The garment based reader system can readily record the presence of any tags without any conscious effort on the part of the garment wearer. The tag data seen by the reader can be stored for later downloading or can be wirelessly transmitted to a separate remote controller.

The inventive smart garment, thus, has the ability to register the presence of tags anywhere in a near zone or space established by the location and/or path taken by the person wearing the smart garment. The wearer can circulate through a facility, performing tasks related or unrelated to tag reading and the smart garment can determine the presence of all tags existing anywhere in the space traversed by the wearer. In a retail application, a store clerk can reface the product shelves and respond to customers' inquiries as he or she would normally. While the clerk accomplishes these necessary tasks, the smart garment can check inventory and proper product location with essentially no effort or attention expended to deploy the RFID system.

BRIEF DESCRIPTION OF THE DRAWINGS

FIG. 4 is a view of a preferred antenna array depicted in a flat configuration; and FIG. 5 is a cross-sectional view of one of the antennas of the array received in an elongated padded fabric pouch.

DESCRIPTION OF THE PREFERRED EMBODIMENT

Figures 1, 2:
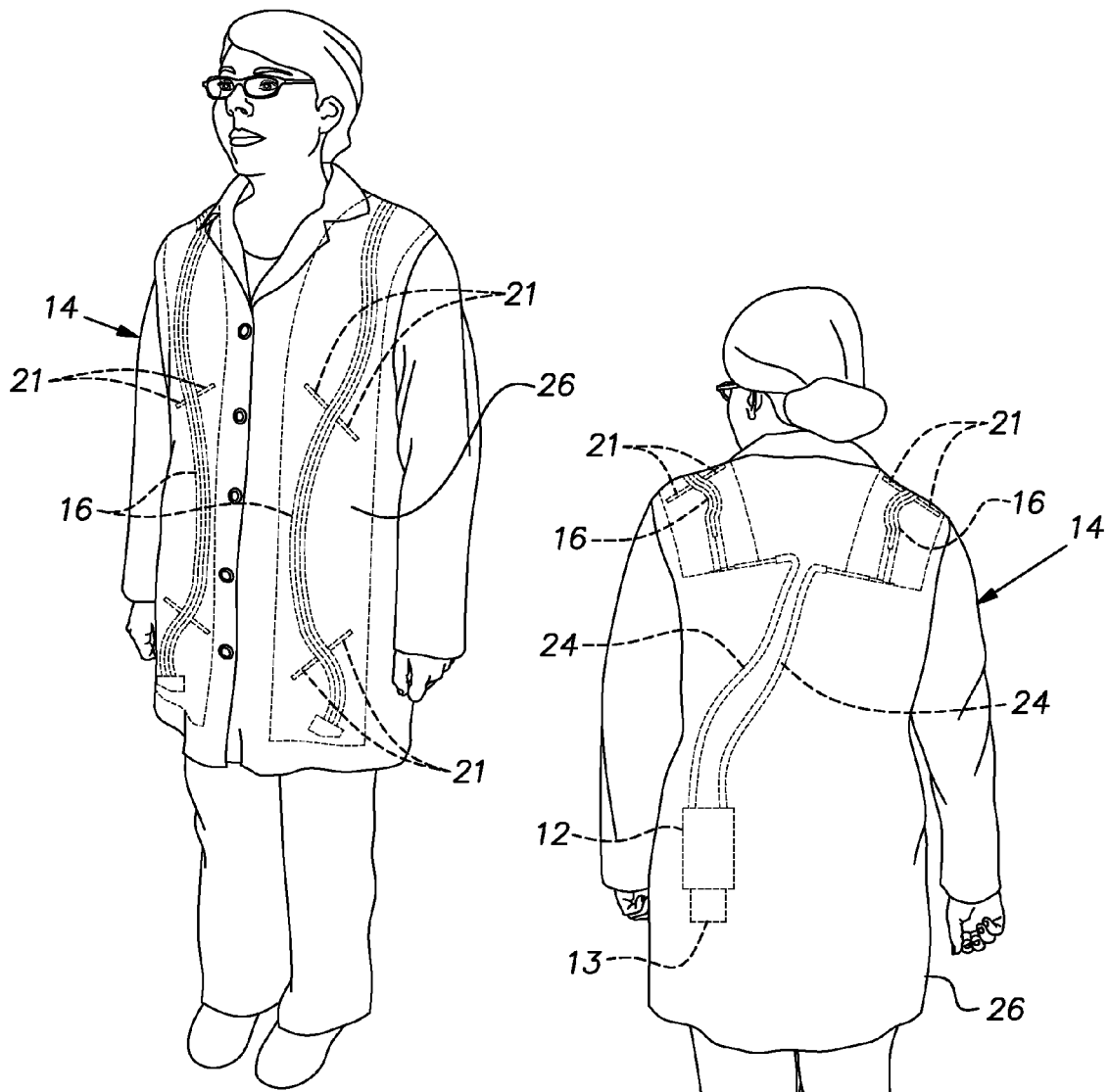
FIG. 1 is a showing of a clerk wearing the smart garment of the invention in the form of a vest.
FIG. 2 is a rear view of the clerk illustrating one arrangement of an antenna array, a reader and associated battery.

The invention relates to a portable RFID system 10 that includes an antenna array 11, a reader 12 and a battery power supply 13 laid out in the plane of the drawing for illustration purposes in FIG. 4. A person 14 depicted in FIGS. 1-3 carries the system 10 to scan RFID tags each associated with an individual object, typically a product, a component, package, or the like. With the system 10 of the invention, the person 14 is free to circulate through a space where RFID tagged goods are situated such as, by way of example, a retail store, warehouse, factory, shipping depot, medical facility, or other space.

A preferred antenna array 11 of the present invention can be similar to that disclosed in U.S. Pat. No. 8,058,998, the disclosure of which is incorporated herein by reference. The present antenna array for radiating or receiving electromagnetic signals, unlike that disclosed in this patent, comprises highly flexible elongated antennas 16 that can be readily folded out of a single plane and are of limited length.

Referring again to FIG. 4, the antenna array 11 preferably comprises two serpentine antennas 16. Each antenna 16, while lying on a flat support, has an elongated axis indicated by the broken line 17 across which a pair of parallel curvilinear feed lines 18 pass back and forth. The antennas 16 may be constructed of a rectangular, flexible, dielectric base sheet or film 19 such as Mylar® on which the feed lines 18, made of an electrically conductive material such as a copper or an aluminum foil, are adhesively attached or otherwise fixed. At spaced locations, the feed lines 18 have perturbations in the form of relatively short stubs 21. The stubs or dipole radiators 21 which are designed to radiate RF energy are typically made of the same material as the feed lines and are electrically connected to a respective feed line. Adjacent pairs of the stubs 21, one on each feed line 18, form dipoles. Preferably, each stub 21 extends at a right angle to the local part of the feed line 18 to which it is joined.

An antenna 16 measured along its axis 17 is about 3 ft. long and the base sheet 19 supporting the stubs 21 is about 7 in. wide. Each antenna 16 is encased in a high durability water-resistant elongated flat fabric pouch 22. A soft cushion layer of batting 23 is placed in the pouch 22 on the side of the antenna 16 which is to face the person 14 that will carry the antenna array 11. A coaxial cable 24, with its center conductor and its outer conductive sheath each connected to one of the feed lines 18 of the associated antenna 16 projects out of a pouch 22.

An effective way of deploying the antenna array 11 is to attach the individual antennas 16 to the inside of a vest 26 or similar garment. Preferably, the antennas 16 are positioned in the garment 26 so that one is on the left and one is on the right and the major length of each is at the front of the garment. The cables 24 are disposed on the inside back of the garment 26 and the radiators or stubs 21 proximate to a cable of each antenna are adjacent a shoulder of the garment 26.

The pouches 22 are preferably releasably held in place on the interior of the garment 26 by a suitable technique such as with Velcro®, snaps, buttons, zippers, pockets or other suitable fasteners. The releasable fasteners enable the pouch to be removed from the garment 26 so that the garment can be laundered or even replaced.

The RFID reader 12 is connected to the antennas 16 through the respective cables 24. The reader 12 and power supply 13, typically a rechargeable battery electrically connected to the reader, are carried by the person 14 wearing the garment 26. The reader 12 and power supply 13 can be located in an inner pocket on the garment 26, secured by fasteners to the garment, or mounted on a waist belt separate from the garment.

Figure 3:
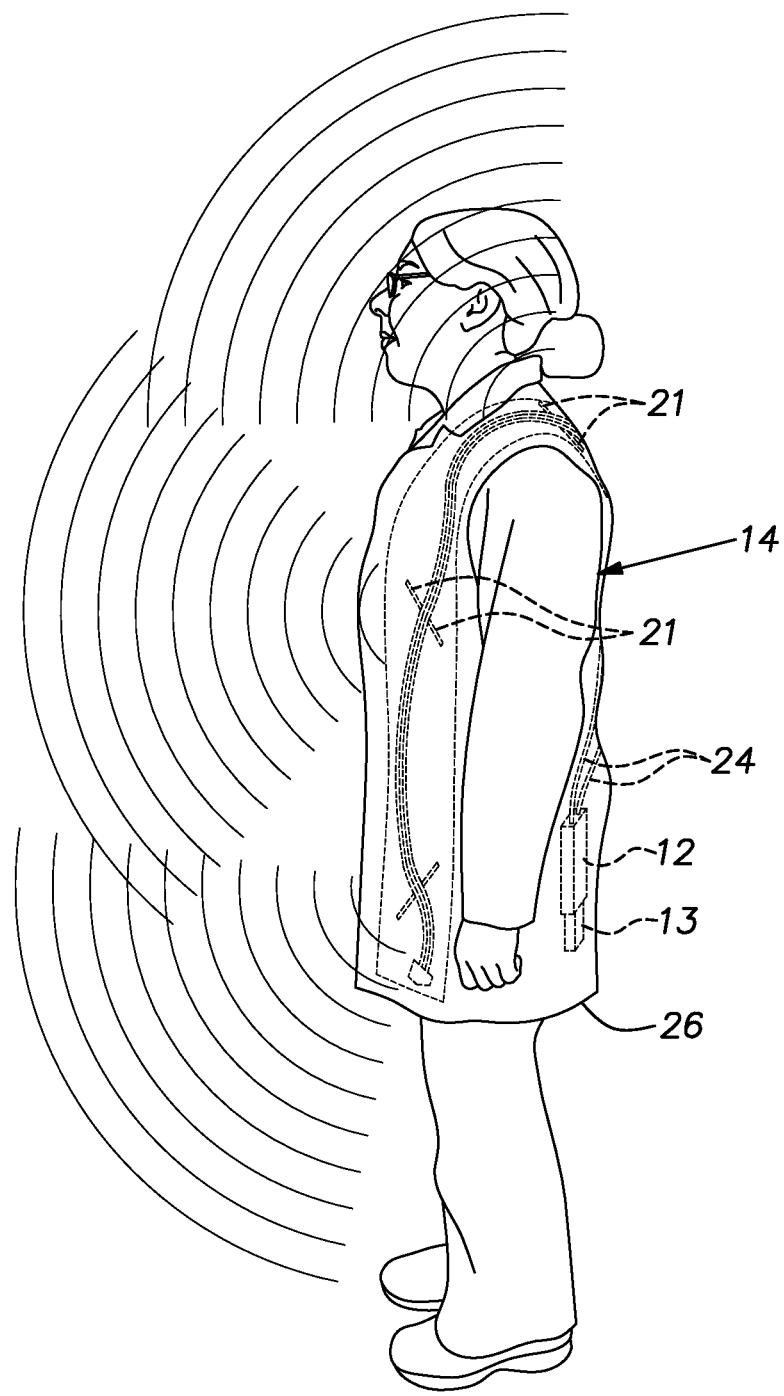
FIG. 3 is a side view of the clerk diagrammatically illustrating the distribution of radiation from an antenna array of the RFID reader system associated with the smart garment.

FIGS. 1-3 illustrate a preferred arrangement of the antenna array 11 being worn by the person or individual 14. FIG. 3 is a diagrammatic representation of the RF beams produced by the individual dipole radiators 21. It will be understood that the antenna array 11 radiates into a near space in front of and to the sides of the person 14 wearing it in a pattern that is generally columnar, extending from floor level to a level overhead of the person 14. Depending on the selected power level, the range of the antenna array 11 can be between 2 and 10 ft.

RF power density that reaches the user is minimal. The power is distributed across all of the antenna stubs 21. Antennas are preferably alternately powered, thus cutting the duty cycle in half. Further, the antennas 16 are not operated when the reader 12 is processing data further reducing the duty cycle of the antennas. The reader 12 energizes the antenna dipoles 21 and receives RFID signals from RFID tags through the antenna dipoles. Where desired, the person 14 wearing the garment 26 can be shielded from antenna radiation by providing a reflective material, for example, in the form of a conductive metal film or cloth next to the person. The spacing of this reflective material, which can be provided, for example, by the batting 23, should be at least ¾ in. from the dipoles 21.

Due to the flexibility of the pouch 22 including its contents and the low weight owing to its cloth/film construction, a person 14 wearing the garment 26 is neither significantly burdened nor restricted in his or her movement by the system 10. In particular, the person's hands and arms are completely free to accomplish any required task while wearing the garment mounted system. It will be understood that a person wearing the system can walk or otherwise traverse a space in which RFID tagged items are situated. The system 10 will read all of the tags within range of the antenna array 11. The reader 12 can either temporarily store the data on a device that can later transfer it to a controller or can wirelessly transmit the data to a remote controller.

While the invention has been described as being mounted on a vest-style garment, other arrangements are envisioned. Where a lab coat or gown is used as the garment 26, the length of the antenna can be increased. It is also possible to arrange the antenna array in a stole or scarf garment. The "smart" garment based system, besides use in retail settings, can be used in other applications such as a factory assembly line, shipping department, and healthcare facilities. The system can verify assembly or shipping accuracy, among other applications, as well as inventory. In each application, the person wearing the system 10 is completely hands free and able to perform traditional or new manual tasks requiring unrestrained hand and/or arm movement.

Specific areas of known location at a facility such as a store, factory, warehouse, or like premises can be permanently provided with a RFID tag. The location or near location of an RFID tagged item can be determined and/or recorded when the system 10 simultaneously detects the item tag and a location tag. No special attention on the part of the person 14 is necessary to locate an item. Where the system 10 communicates wirelessly with a remote controller on a real-time basis, the controller can send directions to the person. For example, if the person is searching the premises for a particular item, the controller can indicate, by radio, audio or visual signal, to the person that he or she is in the immediate vicinity of the item. The person 14 wearing the garment 26 and/or the garment itself can be provided with a RFID tag for purposes of monitoring work activity of the person, especially where location indicating RFID tags are strategically situated on the premises.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A system comprising, an RFID antenna array, an RFID tag reader, and a power supply, the foregoing components being adapted to be worn or otherwise borne by a person and be operatively connected so that the power supply powers the reader and the reader energizes the antenna array and receives RFID tag signals through the antenna array while the person passes through an area as the person's hands and arms are unencumbered by said components, the antenna array being a twin feed unit of serpentine conductors with multiple dipole radiators extending generally perpendicularly to the conductors, a reflective material being spaced at least ¾ inch from the dipole radiators, the antenna array being arranged to simultaneously radiate a near zone in front of the person from floor level to above the person's head.

2. A system as set forth in claim 1, wherein the antenna array includes two separate twin feed antennas.

3. A system as set forth in claim 2, wherein the antennas are arranged to be situated one on the left and one on the right of a torso of the person.

4. A system as set forth in claim 3, wherein the antennas are twin feed units having dipole radiators distributed along their length, a dipole radiator being positionable on or behind a respective shoulder of the person such that it can radiate upwardly to a level above the head of the person.

5. A system as set forth in claim 4, wherein said twin feed antennas have serpentine conductors mounted on an elongated flexible dielectric sheet, the sheets being adapted to overlie a left or right shoulder of the person.

6. A system as set forth in claim 5, wherein the antennas are each disposed in an elongated fabric padded pouch.

7. A method of reading RFID tags in a space by using an RFID antenna array mounted on a torso of a person capable of passing through the space, the antenna array being situated on the torso and being in the form of twin feed serpentine conductors and multiple dipole radiators generally perpendicular to the conductors distributed over the person's torso with a reflective material spaced at least ¾ inch from the dipole radiators in a manner that leaves the person's hands and arms free to accomplish tasks other than supporting the antenna array while the antenna array scans a near zone from floor level to an overhead level and conveys RFID tag data to an RFID reader borne by the person.

8. A method as set forth in claim 7, wherein said antenna array is provided as two elongated flexible multi-radiator antennas, each of the antennas being draped over a respective shoulder of the person.

9. A method as set forth in claim 8, wherein a radiation site of each antenna is located on or behind a respective shoulder of the person.

10. A method as set forth in claim 9, wherein each antenna is formed by twin feed lines mounted on a flexible dielectric sheet, each sheet being removably attached to a vest worn by the person.

11. A method as set forth in claim 10, wherein the antennas are each contained in a respective elongated fabric padded pouch, each pouch being removably attached to the interior of the vest.

12. A method as set forth in claim 7, wherein RFID tags are permanently located at known locations at the space where the system is used.

\* \* \* \* \*